(12) United States Patent
Benezra

(10) Patent No.: US 10,788,663 B2
(45) Date of Patent: Sep. 29, 2020

(54) METHOD AND APPARATUS FOR REFECTION SUPPRESSION IN OPTICAL SYSTEMS

(71) Applicant: Moshe Benezra, Jersey City, NJ (US)

(72) Inventor: Moshe Benezra, Jersey City, NJ (US)

( * ) Notice: Subject to any disclaimer, the term of this patent is extended or adjusted under 35 U.S.C. 154(b) by 109 days.

(21) Appl. No.: 16/195,684

(22) Filed: Nov. 19, 2018

(65) Prior Publication Data
US 2019/0155022 A1    May 23, 2019

Related U.S. Application Data

(60) Provisional application No. 62/589,517, filed on Nov. 21, 2017.

(51) Int. Cl.
| G02B 27/00 | (2006.01) |
| G02B 5/09 | (2006.01) |
| G02B 21/36 | (2006.01) |
| G02B 23/02 | (2006.01) |
| G02B 5/00 | (2006.01) |
| G02B 23/16 | (2006.01) |

(52) U.S. Cl.
CPC ......... *G02B 27/0012* (2013.01); *G02B 5/003* (2013.01); *G02B 5/09* (2013.01); *G02B 21/361* (2013.01); *G02B 21/362* (2013.01); *G02B 23/02* (2013.01); *G02B 27/0018* (2013.01); *G02B 23/16* (2013.01)

(58) Field of Classification Search
None
See application file for complete search history.

(56) References Cited

U.S. PATENT DOCUMENTS

| 7,646,532 B2* | 1/2010 | Capouilliet | H04B 10/2537 359/334 |
| 7,806,533 B2* | 10/2010 | Boute | G02B 30/56 353/98 |
| 8,830,573 B2* | 9/2014 | Cui | A61B 5/0059 359/368 |
| 2003/0179993 A1* | 9/2003 | Shigenaga | G02B 6/3885 385/33 |
| 2007/0195262 A1* | 8/2007 | Mosse | B29C 63/16 351/159.56 |
| 2009/0096895 A1* | 4/2009 | Benezra | H04N 9/735 348/234 |
| 2010/0277779 A1* | 11/2010 | Futterer | G02F 1/1335 359/9 |
| 2014/0078592 A1* | 3/2014 | Hotta | G02B 5/30 359/633 |

* cited by examiner

*Primary Examiner* — Nina Bhat

(57) ABSTRACT

A method and apparatus to suppress stray light refection in enclosures of optical trains are presented. Unlike prior-art that relies on absorption to suppress stray light the presented invention relies on reflections in a tapered enclosure to prevent stray light from reaching the sensor. The presented invention also provides a method to reshape the tapered enclosure into more convenient shapes using Fresnel Design. The presented invention can be realized in different ways including but not limited to (1) a monolithic enclosure, (2) a modular enclosure that can adapt to different lenses and or sensors, (3) a sleeve to be inserted into existing enclosure to enhance their performance.

18 Claims, 8 Drawing Sheets

FIG. 3 PRIOR ART
FIG. 4 PROPOSED METHOD

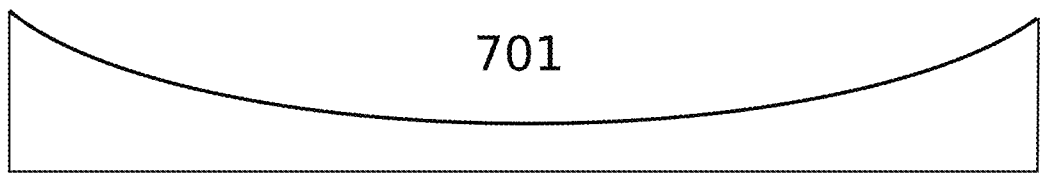
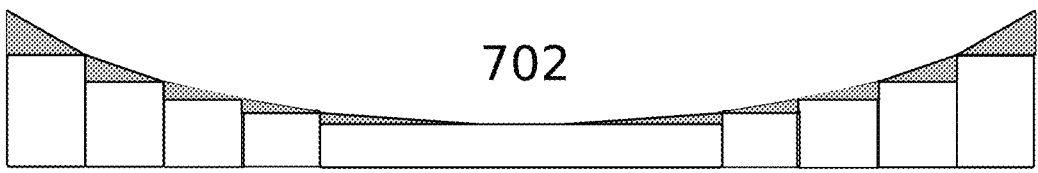
FIG. 7 PRIOR ART

METHOD AND APPARATUS FOR REFECTION SUPPRESSION IN OPTICAL SYSTEMS

RELATED APPLICATIONS

This application is a non-provisional of and claims the benefit of the filing date of U.S. Provisional Patent Application No. 62/589,517 filed Nov. 21, 2017, the entire disclosure of which is herein incorporated by reference.

FIELD OF TECHNOLOGY

The present invention relates to the suppression of unwanted reflection from the walls or enclosure of an optical system and in particular to the suppression of unwanted reflection in tubes uses in microscopes, telescopes, periscopes, endoscopes, binoculars and similar optical devices.

The invention is especially useful in the presence of a high dynamic range scene, such as angular proximity to a light source, for example, the sun, moon, light bulb, laser, or for imaging high dynamic range (HDR) objects such as transparencies, color and black and white negatives, and HDR objects viewed by a microscope or telescope.

In other words, the basic types of things that the invention improves is to enable clear image capture by said system especially under HDR conditions that is free of artifacts created by unwanted reflection from the system enclosure or walls.

BACKGROUND

For clarity of description, and without loss of generality, the background, problem description, reduction to practice and testing are given here in the context of an actual problem found in a microscope extension tube in a digital microscope.

Microscope objectives can be used to capture images directly by a camera without a need for an eyepiece. This is achieved by either using a finite conjugate objective or an infinity corrected objective together with a tube lens. In both cases, a real image is projected onto and captured by the image sensor (a photographic film or a digital sensor).

An extension tube (barrel) is usually used to hold the component of the optical train in place as well as to shield it from stray light and dust.

Problems occur when imaging high dynamic range objects such as a transparency or a Black and White negative with adjacent clear and high-density regions. The higher sensitivity of the camera that is needed to capture details in the dark regions makes the camera more susceptible to reflections from the walls of the extension tube. This results with unwanted artifacts on the image.

What is needed is a way to better suppress the unwanted reflection in cases where absorption is not sufficient (some light is reflected even with the best known absorbing material) to obtain a clean and usable image.

For example, the best coating material offered on the market has about 1% diffused reference, whereas the contrast ratio of BW film (s.a. Kodak Tri-X) exceeds 1:100,000, a 99% absorption may not be sufficient to suppress reflection in high dynamic range conditions.

One way to evade the problem is to use a conical extension with a sufficiently wide angle. This approach is used in view camera bellows. If the rays from the objective never hit the walls of the extension cone then, obviously, they cannot be reflected by these walls.

This approach has two problems. Firstly, with a cone length of 160 mm (DIN finite conjugate) or 200 mm (infinity corrected), the cone size may become "too large to fit" in many applications. Secondly, this solution only evades the problem, if an objective lens with a larger fan-out angle is used then the problem will persists.

The inner surface of the extension tube can be made with threading or other cavities that "trap" the light. That is, it forces the rays to undergo additional reflections, each reduces the intensity of the rays by absorbing part of its energy at each bounce. However, as shown by the Figures ahead, it is not sufficient to overcome the problem in high dynamic range imaging.

OBJECTS

It is an object of this invention to overcome the limitation of absorbing coating and light traps in difficult imaging conditions, such as ad high dynamic range imaging.

BRIEF DESCRIPTION OF THE DRAWINGS

For a more complete understanding of the invention, reference is made to the following description and accompanying drawings, in which:

FIG. 3 is an example image degradation caused by light reflection problem using prior art;

FIG. 4 is an example clean image captured using the proposed method;

FIG. 7 is a schematic diagram showing the design of a Fresnel mirror (prior art);

DETAILED DESCRIPTION

Figure 1:
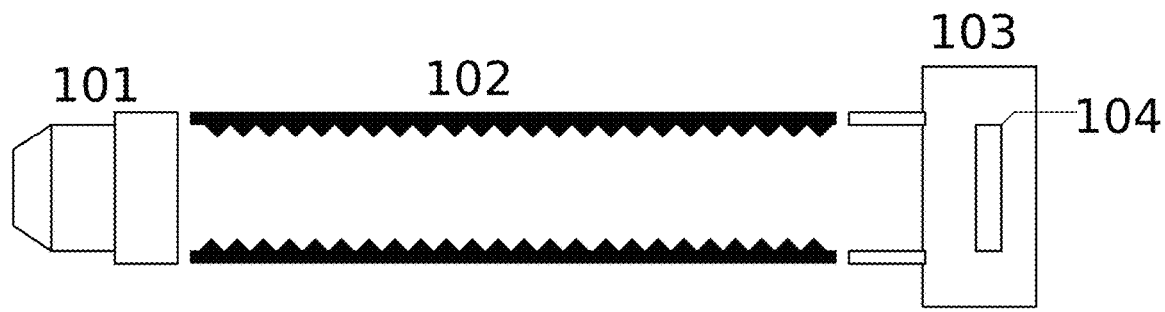
FIG. 1 is an example of prior art.

The problem that is addressed by this invention is illustrated in FIG. 1 (prior art). Light from a microscope objective lens 101 travels through the enclosure 102 to a camera 103 where it is captured by a sensor 104.

Figure 2:
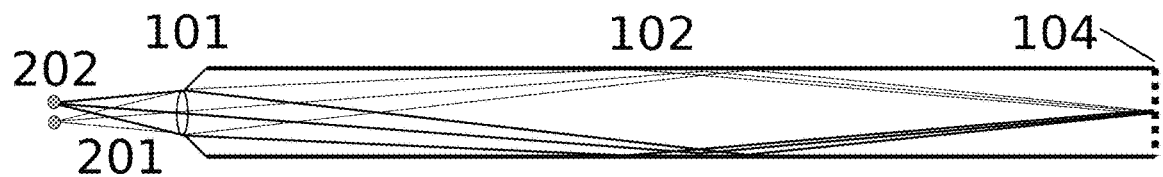
FIG. 2 is a schematic diagram illustrates the light reflection problem.

As shown in FIG. 2 some of said light 201 that is originated at points 202 travel through the objected 101, then reflected from the enclosure 102 walls and is captured by the sensor 104.

When said reflected light is captured by said sensor it creates an artifact shown as a dark spot in the center of FIG. 3. This figure is a reversal (positive) image of an image of a Black and White negative film captured by a microscope that uses prior art threaded enclosure to trap the light and absorbing coating that clearly were not sufficient to overcome the stray light problem in these conditions.

FIG. 4 shows a reversal image of the same object captured using the proposed method. This image shows no such artifact.

Figure 5:
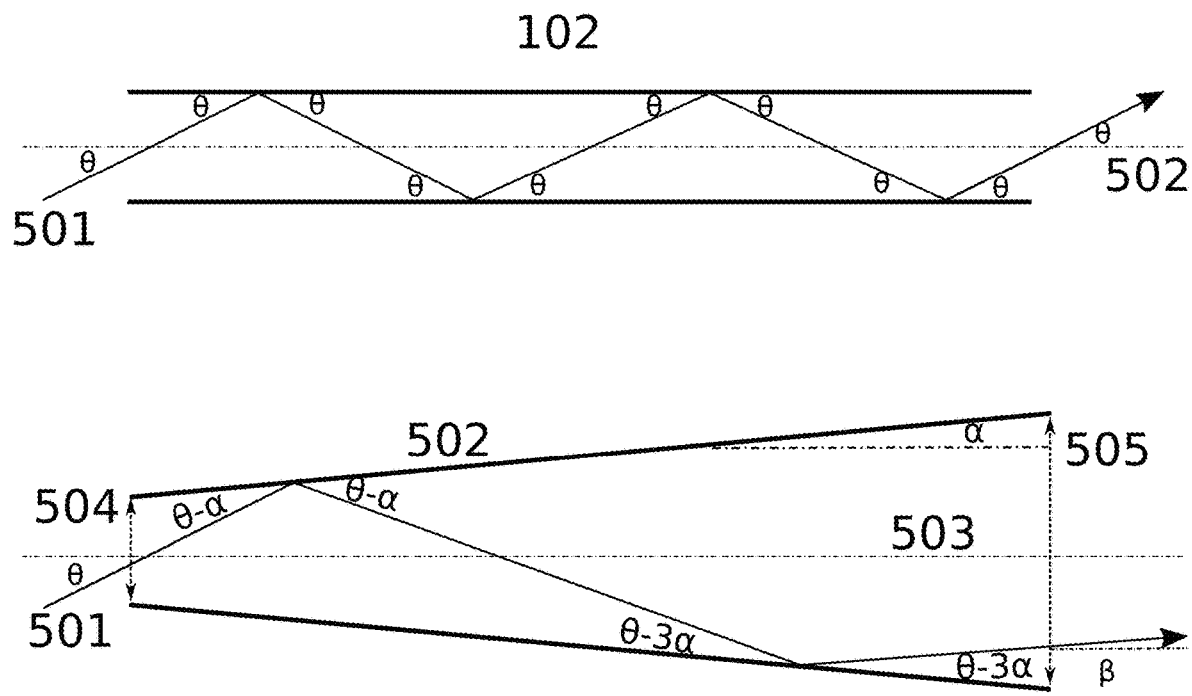
FIG. 5 is a schematic diagram showing light path through a parallel and a tapered light conduit traveling from the small aperture to the large aperture.

In FIG. 5 we can see that when light 501 is reflected by a parallel (non-tapered) enclosure 102, it has the same incident angle θ at each reflection, and by laws of reflection, the reflected angle is also θ

When light 501 is reflected by a tapered enclosure 502 that is tapered by an angle α relative to the optical axis 503 and light travels from the small aperture 504 to the large aperture 505, then the incident angle becomes shallower with each reflection: (θ−a), (θ−3α), (θ−5α) . . . .

Figure 6:
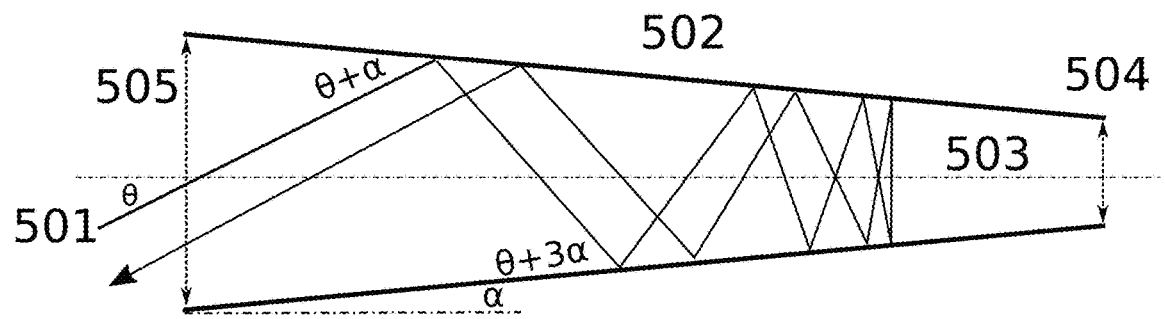
FIG. 6 is a schematic diagram showing light path of a ray traveling from the large aperture to the small aperture and exceeding the acceptance numerical aperture of the large aperture.

However, when light is reflected by a tapered enclosure 502 but travels from the large aperture 505 to the small aperture 504 then as show in FIG. 6 the incident angle becomes sharper with each reflection: (θ+α), (θ+3α), (θ+5α) . . . .

When the incident angle exceeds 90°, the light reverses its direction. In other words, it does not reach the sensor and therefore does not cause artifacts. Thus the reflection is suppressed, not by absorption as prior art does but by reflection. Of course, having absorbing surfaces helps as long as it maintains the reflection properties described above and does not scatter the light in unwanted directions.

These properties of tapered enclosures, or more generally a light guide, are well known in the fiber-optics field, where it is generalized to include the material (typically glass) in which light travels through. $NA_{out}=RNA_{in}$, where $NA_{in}$ is the input numerical aperture, $NA_{out}$ is the output numerical aperture and R is the ratio of tapered light guide input diameter to output diameter.

While tapered enclosures suppresses rays that exceed the acceptance angle it is uncomfortable as optical tapered enclosures (such as bellows) usually follow the fan-out shape of the light from the small aperture to the large one and not vice versa.

To overcome this limitation we use a Fresnel Design, similar to the Fresnel mirror shown in FIG. 7. In this Figure, a concave mirror 701 is reshaped into a more flat shape 703 by removing the white rectangles shown in 702 and leaving only the shaded area (surface and support). Notice that the continuous surface of the mirror is now divided into segments, each segment has a continuous surface, but there are discontinuities between segments.

Figure 8:
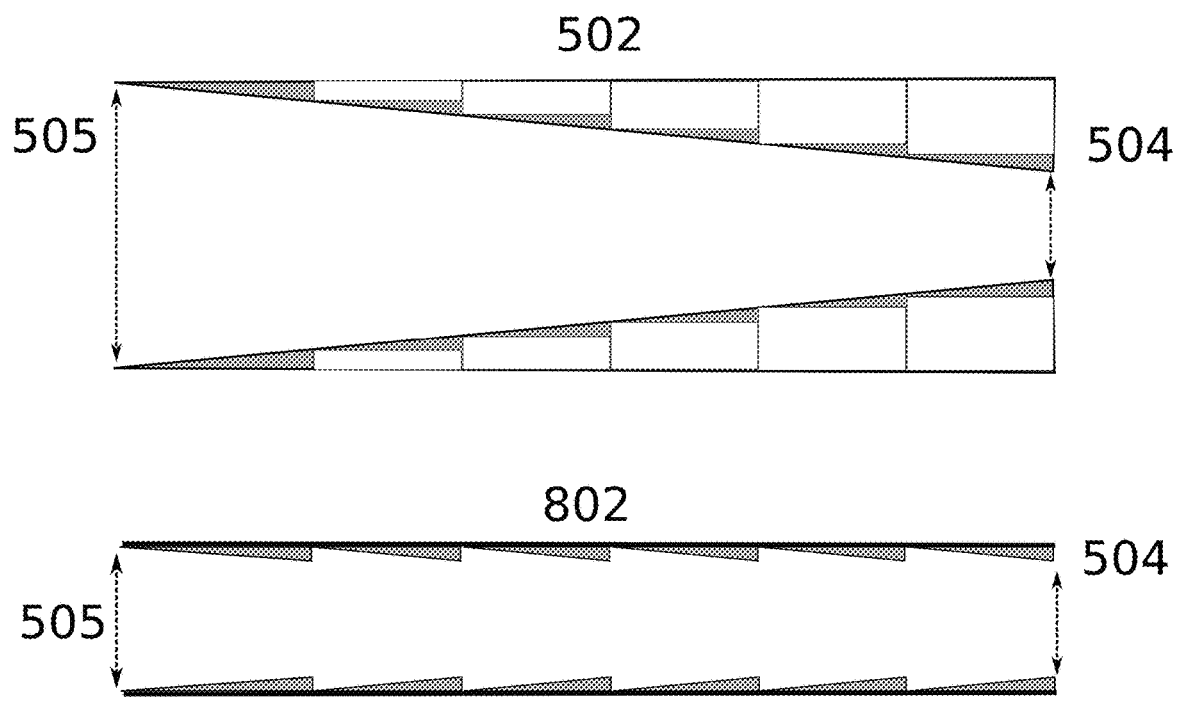
FIG. 8 is a schematic diagram showing the embedding of a tapered conduit within a parallel conduit using Fresnel design.

FIG. 8 shows the Fresnel Design applied to the tapered enclosure, The white rectangles in 502 removed and only the shaded areas are kept, effectively reshape the tapered enclosure 502 as a tube 802 while keeping the optical properties of a tapered enclosure.

Figure 9:
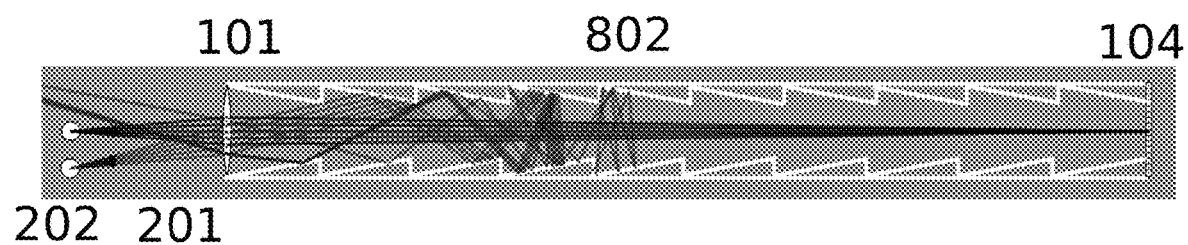
FIG. 9 is a schematic diagram showing ray tracing through the proposed design.

FIG. 9 shows ray tracing through the Fresnel Design tapered enclosure 802. We can see that stray light that is reflected from the walls of the enclosure are diverted and do not reach the sensor 104.

Figure 10:
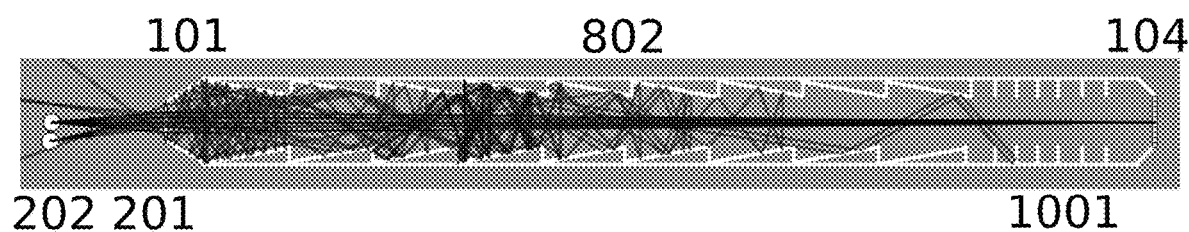
FIG. 10 is a schematic diagram showing optional light trap at the sensor side.

FIG. 10 show ray trace through a microscope adapter using the proposed design. A light trap 1001 is added just before the sensor to capture any rays that still manage to pass the tapered enclosure (in case their incident angle was shallow and did not exceed the acceptance angle).

Figure 11:
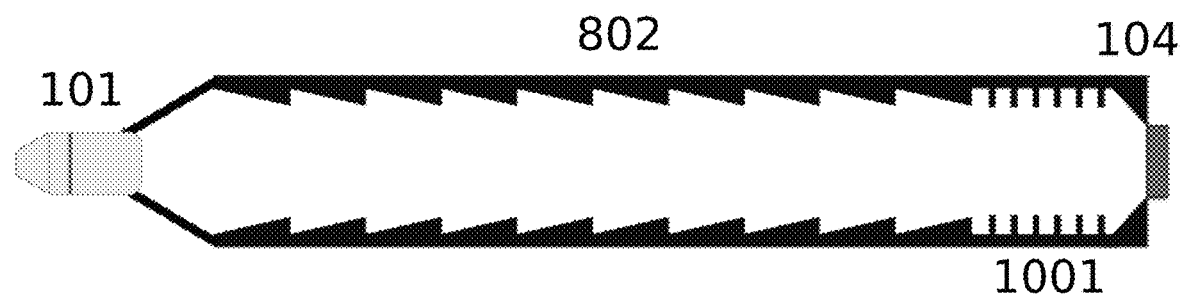
FIG. 11 is a schematic diagram showing a microscope adapter using the proposed method.

FIG. 11 shows an illustration of the microscope adapter with the objective lens.

Figure 12:
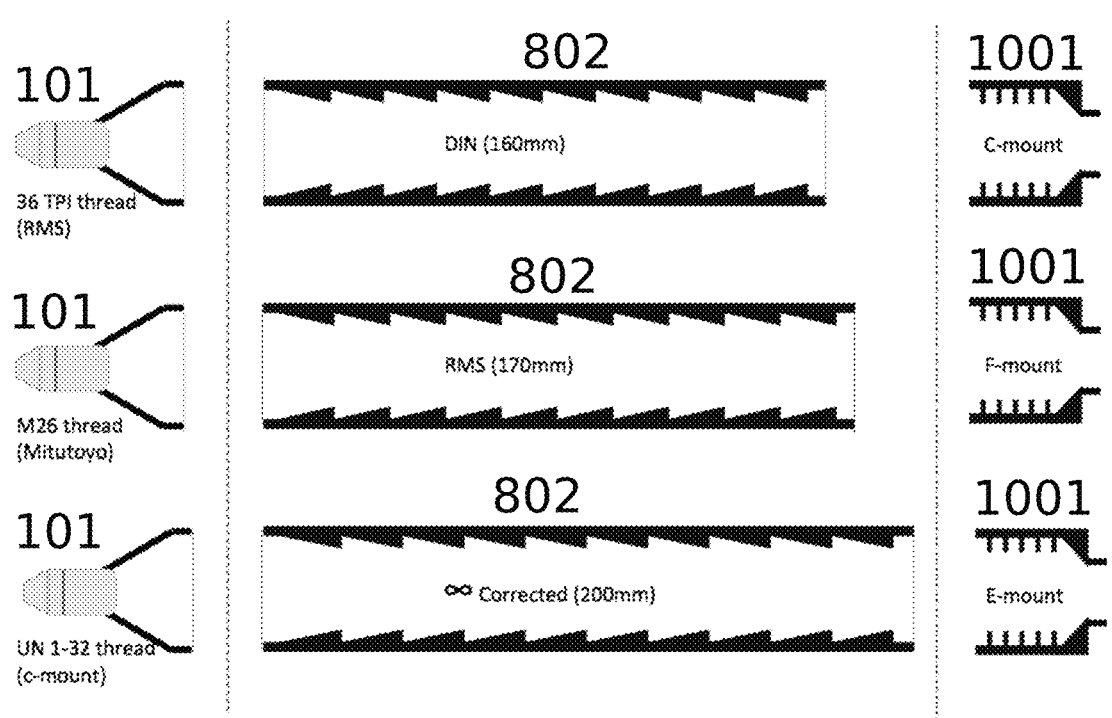
FIG. 12 is a schematic diagram showing a modular microscope adapter using the proposed method.

FIG. 12 shows a modular arrangement of the microscope adapter, where different standard objective lenses 101 use and of extension tube 802 connecting any of light traps 1001 having different camera mount adapters.

Figure 13:
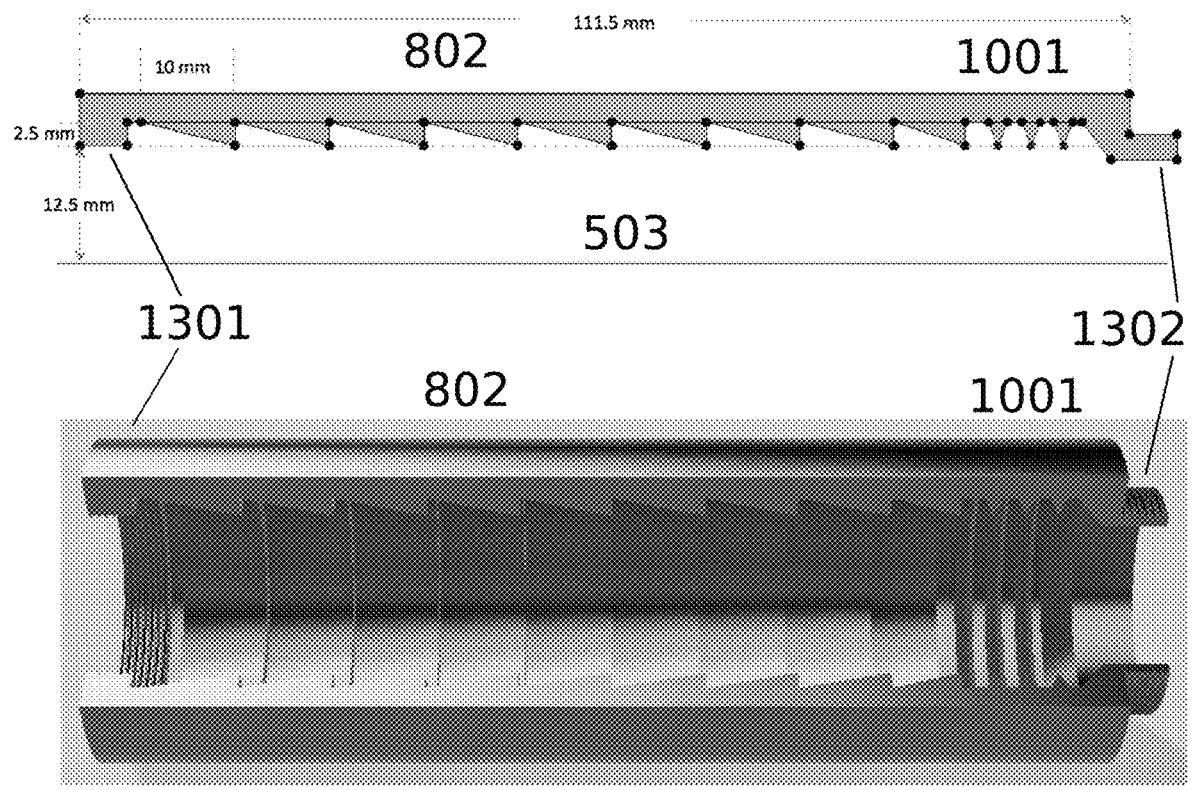
FIG. 13 shows the cad design of a microscope adapter prototype using the proposed method.

FIG. 13 shows a cad design of a C-Mount microscope adapter having a Fresnel Design tapered tube 802 and light trap 1001. The objective lens is connected to the C-Mount 1301 using an objective lens thread to C-Mount thread adapter at one end, and a C-Mount camera is connected to the C-Mount adapter 1302 at the other end.

Figure 14:
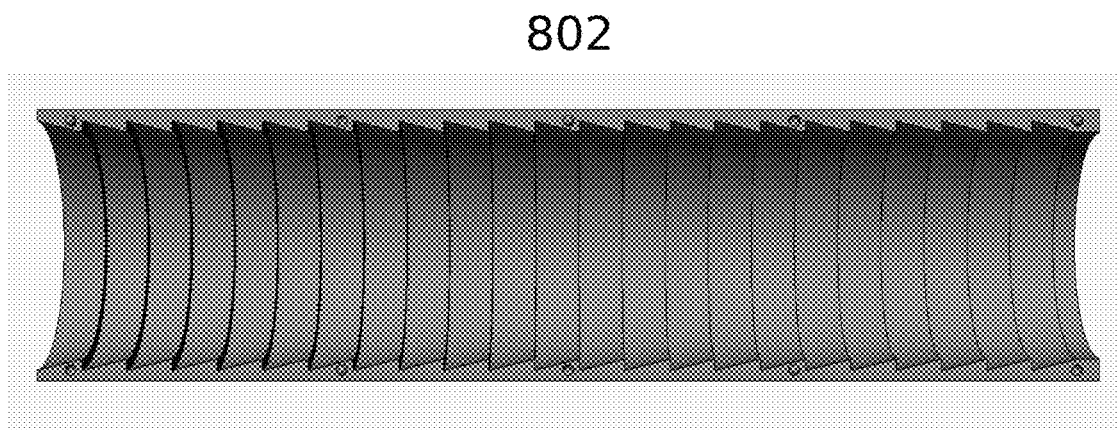
FIG. 14 shows the cad design of a sleeve insert (half) using the proposed method.

FIG. 14 shows a cad design of half of a tapered enclosure formed as a thin sleeve that can be inserted into an existing cylindrical tube of a microscope or other optical device and make it effectively a tapered one. Two such halves or one full sleeve are needed. Not fully closed sleeves are also possible where needed but are less effective.

The Fresnel Design can also be implemented over a (tapered) Polyhedron or truncated Polyhedron with any number of faces, for example, a pyramid.

Both the Fresnel cone and the polyhedron shapes can be embedded in different "hosting" shapes that may be more suitable for a specific application, including but not limited to other cones and polyhedrons, tubes with different cross-section shape including circular, elliptical, and polygonal such as, triangle, rectangle, pentagon hexagon, octagon and so forth.

The cross of the enclosure section need not be regular; it doesn't even need to be convex.

The above description was given in the context microscope extension tube, in which the problem was initially detected and resolved.

That said, the proposed solution applies to other applications including but not limited to (i) microscopes with or without eyepiece, (ii) telescopes (iv) periscopes (iv) endoscopes or any application that needs to suppress unwanted reflections from the walls of an optical train.

CONCLUSION

The above description (including without limitation any attached drawings and figures) describes exemplary implementations of the invention. However, the invention may be implemented in other ways.

The methods and apparatus which are described above are merely illustrative applications of the principles of the invention.

Numerous modifications may be made by those skilled in the art without departing from the scope of the invention. Also, this invention includes without limitation each combination or sub-combination of one or more of the above-mentioned implementations, embodiment, and features.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed:

1. A Sequential optical system or a sequential part of an optical system comprising:

(a) an enclosure or housing comprising walls and an inner volume in which light travels through;

or (b) a light conduit having an inner volume and a boundary between the inner volume and its surroundings;

wherein:

said enclosure or the conduit can be divided into one or more segments along the optical axis wherein:
  i. the surface of each segment is continuous;
  ii. each segment has an entry clear aperture with diameter of $D^i_{entry}>0$ and an exit clear aperture with diameter $D^i_{exit}>0$, where i=1 . . . n is the segment number;
  iii. the cumulative magnification of all segments from $D^1_{entry}$ to $D^n_{exit}$ is at least 2; wherein $[D^1_{entry}+\Sigma^n_{i=1}(D^i_{exit}-D^i_{entry})]/D^1_{entry} \geq 2$.

2. The sequential optical system of claim 1, wherein the enclosure, housing or the conduit comprises one or more trimmed conical segments.

3. The sequential optical system of claim 2, wherein all of the segments are identical conical segments.

4. The sequential optical system of claim 3, wherein the enclosure, housing or conduit is a microscope lens tube.

5. The sequential optical system of claim 4, wherein the microscope lens tube comprises an adapter for mounting one or more objective lens.

6. The sequential optical system of claim 4, wherein the microscope lens tube comprises an adapter for mounting one or more cameras.

7. The sequential optical system of claim 3, wherein the segments form a sleeve (S) wherein said sleeve has an outer diameter (SD) that is inserted into a tube (T) having an inner diameter TD, wherein SD≤TD where said sleeve S has a wall thickness (K) and wherein K≤0.2TD.

8. The sequential optical system of claim 7, wherein the tube T is a lens tube for a microscope.

9. The sequential optical system of claim 7, wherein the tube T is a lens or mirror tube for a telescope.

10. The sequential optical system of claim 3, wherein the enclosure or housing or conduit is a telescope lens or mirror tube.

11. The sequential optical system of claim 9, wherein said telescope lens or mirror tube comprises mounts to one of more cameras.

12. The sequential optical system of claim 1, wherein the enclosure, housing or conduit comprises one or more pyramidal segments, wherein the apex of each pyramidal segment is trimmed.

13. The sequential optical system of claim 12, wherein all the pyramidal segments are identical.

14. The sequential optical system of claim 12, wherein the enclosure is for a telescope.

15. The sequential optical system of claim 12, wherein the enclosure comprises mounts for mounting different cameras.

16. The sequential optical system of claim 12, wherein the segments form a polyhedral sleeve (S) having an outer diameter (SD) that is inserted into a polyhedron enclosure (P) with inner diameter (PD), wherein SD≤PD and the sleeve (S) has wall thickness (K), K≤0.2PD.

17. The sequential optical system of claim 16, wherein the enclosure P is for a telescope.

18. A method of suppressing stray light reflection in an optical comprising:

(a) providing a tapered enclosure wherein: said enclosure or the conduit can be divided into one or more segments along the optical axis wherein:
  i. the surface of each segment is continuous;
  ii. each segment has an entry clear aperture with diameter of $D_{entry}^i>0$ and an exit clear aperture with diameter $D_{exit}^i>0$, where i=1 . . . n is the is the segment number;
  iii. the cumulative magnification of all segments from $D_{entry}^1$ to $D_{exit}^n$ is at least 2; wherein $[D_{entry}^1+\Sigma_{i=1}^n(D_{exit}^i-D_{entry}^i)]/D_{entry}^1 \geq 2$;

(b) inserting said tapered enclosure into a microscope, telescope or sequential optical system wherein the tapered enclosure suppresses stray light reflections in said microscope, telescope or sequential optical system.

* * * * *